United States Patent
Nelliappan

(10) Patent No.: US 11,261,296 B2
(45) Date of Patent: Mar. 1, 2022

(54) SEMI-AROMATIC COPOLYAMIDES BASED ON CAPROLACTAM

(71) Applicant: AdvanSix Resins & Chemicals LLC, Parsippany, NJ (US)

(72) Inventor: Veera Nelliappan, Richmond, VA (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 0 days.

(21) Appl. No.: 16/495,048

(22) PCT Filed: Apr. 18, 2018

(86) PCT No.: PCT/US2018/028130
§ 371 (c)(1),
(2) Date: Sep. 17, 2019

(87) PCT Pub. No.: WO2018/200283
PCT Pub. Date: Nov. 1, 2018

(65) Prior Publication Data
US 2020/0283576 A1 Sep. 10, 2020

Related U.S. Application Data

(60) Provisional application No. 62/489,532, filed on Apr. 25, 2017.

(51) Int. Cl.
*C08G 69/28* (2006.01)
*C08K 3/40* (2006.01)
*C08K 5/00* (2006.01)
*C08K 5/13* (2006.01)

(52) U.S. Cl.
CPC ............. *C08G 69/28* (2013.01); *C08K 3/40* (2013.01); *C08K 5/0066* (2013.01); *C08K 5/13* (2013.01); *C08K 2201/014* (2013.01)

(58) Field of Classification Search
CPC ................................................ C08G 69/28
See application file for complete search history.

(56) References Cited

U.S. PATENT DOCUMENTS

| | | |
|---|---|---|
| 3,563,959 A | 2/1971 | Schade et al. |
| 5,030,709 A | 7/1991 | Pipper et al. |
| 5,039,786 A | 8/1991 | Pipper et al. |
| 5,418,068 A | 5/1995 | Caluori et al. |
| 5,674,973 A | 10/1997 | Pipper et al. |
| 5,763,561 A | 6/1998 | Keske |
| 5,773,500 A | 6/1998 | Reichmann |
| 6,429,279 B1 | 8/2002 | Hünger et al. |
| 6,747,120 B2 | 6/2004 | Rulkens et al. |
| 6,878,798 B2 | 4/2005 | Ohlbach et al. |
| 8,424,636 B2 | 4/2013 | Jones et al. |
| 9,428,612 B2 | 8/2016 | Rulkens et al. |
| 9,441,085 B2 | 9/2016 | Norfolk |
| 2014/0011925 A1 | 1/2014 | Pauchard |
| 2014/0370278 A1 | 12/2014 | Hausmann et al. |
| 2015/0210834 A1 | 7/2015 | Mizumoto et al. |
| 2015/0361217 A1 | 12/2015 | Zhang et al. |
| 2016/0075827 A1 | 3/2016 | Welch et al. |

FOREIGN PATENT DOCUMENTS

| | | |
|---|---|---|
| EP | 1226202 A1 | 7/2002 |
| WO | 2015144630 A1 | 10/2015 |

OTHER PUBLICATIONS

Cakir, S. et al. (2012). Incorporation of a semi-aromatic nylon salt into polyamide 6 by solid-state or melt polymerization. Polymer, 53(23): Abstract.
International Preliminary Report on Patentability issued in PCT/US2018/028130, dated Nov. 7, 2019, 8 pages.
International Search Report and Written Opinion issued in PCT/US2018/028130, dated Jul. 23, 2018, 13 pages.
Norrey, C. et al. (2008). Driving forces for metal replacement opportunities in the automotive industry. SAE Technical Paper 2008-36-0140, doi:10.4271/2008-36-0140, Abstract.
Papaspyrides, C. D. et al. (2016). Solid state polymerization in a micro-reactor: The case of poly(tetramethylene terephthalamide). Journal of Applied Polymer Science, 133(14): Abstract.

*Primary Examiner* — Arrie L Reuther
(74) *Attorney, Agent, or Firm* — Faegre Drinker Biddle & Reath LLP

(57) ABSTRACT

The present disclosure provides polyamide 6 copolymers polymerized from caprolactam, tetramethylene diamine, and terephthalic acid monomers. The copolymers exhibit sufficiently high second heat melting points such that they are capable of being processed using traditional melt processing operations, while also being useful for high temperature applications. The copolymer may be used as polymeric base compositions useful for a variety of applications including the manufacture of metal-replacing articles.

7 Claims, No Drawings

SEMI-AROMATIC COPOLYAMIDES BASED ON CAPROLACTAM

CROSS-REFERENCE TO RELATED APPLICATIONS

This application is a 371 National Stage application of International Application No. PCT/US2018/028130, filed Apr. 18, 2018, which claims priority to U.S. Provisional Application No. 62/489,532, filed Apr. 25, 2017, each of which is herein incorporated by reference in its entirety.

FIELD

The present disclosure is generally related to the field of polyamides and a method of preparing the same. In particular, the present disclosure is related to semi-aromatic polyamide 6 copolymers formed from caprolactam, tetramethylene diamine, and terephthalic acid.

BACKGROUND

Polyamides are generally valued for their strength, toughness, and chemical resistance in many engineering applications. Recently, polyamides have been used for replacing metal in automobiles, electrical/electronic components, etc., in order to reduce the weight of these articles. However, any polyamide with a low melting point will have a restricted use in high temperature applications such as automobiles and electrical/electronic components. On the other hand, if the melting point of a polyamide is too high compared to its decomposition temperature, the polyamide will be difficult to melt process.

More recently, classes of polyamides have been introduced to the market that are capable of being melt processed and then exposed to high temperatures for extended periods of time. However, the high selling price of these materials has limited their use in many practical applications.

As such, what is needed is a melt processable polyamide with improved use temperatures that can be obtained using economical materials.

SUMMARY

The present disclosure provides polyamide 6 copolymers polymerized from caprolactam, tetramethylene diamine, and terephthalic acid monomers. The copolymers exhibit sufficiently high second heat melting points such that they are capable of being processed using traditional melt processing operations, while also being useful for high temperature applications. The copolymer may be used as polymeric base compositions useful for a variety of applications including the manufacture of metal-replacing articles.

In one form thereof, the present disclosure provides a semi-aromatic polymeric base composition for use in manufacturing a finished article via melt processing, the polymeric base composition including at least one polyamide 6 copolymer polymerized from caprolactam, tetramethylene diamine, and terephthalic acid monomers, the copolymer having a second heat melting point temperature between 260° C. and 315° C.

The at least one polyamide 6 copolymer may contain between 25 and 70 wt. % of caprolactam monomers, based on the total weight of the polyamide 6 copolymer. The at least one polyamide 6 copolymer may contain between 35 and 60 wt. % of caprolactam monomers, based on the total weight of the polyamide 6 copolymer.

The at least one polyamide 6 copolymer may additionally be polymerized from isophthalic acid monomers. The at least one polyamide 6 copolymer may contain between 0.5 and 2 wt. % of isophthalic acid monomers, based on the total weight of the polyamide 6 copolymer.

The polymeric base composition may further include at least one of glass fibers, antioxidants, and flame retardants.

The at least one polyamide 6 copolymer may have a weight average molecular weight (Mw), as determined by Gel Permeation Chromatography (GPC), between 15,000 Daltons and 30,000 Daltons.

In another form thereof, the present disclosure provides a semi-aromatic polymeric base composition for use in manufacturing a finished article via melt processing, the polymeric base composition including at least one polyamide 6 copolymer polymerized from caprolactam, tetramethylene diamine, and terephthalic acid monomers, the copolymer containing between 25 and 70 wt. % of caprolactam monomers, based on the total weight of the polyamide 6 copolymer.

The at least one polyamide 6 copolymer may contain between 35 and 60 wt. % of caprolactam monomers. The at least one polyamide 6 copolymer may have a second heat melting point temperature between 260° C. and 315° C.

The at least one polyamide 6 copolymer may additionally be polymerized from isophthalic acid monomers. The at least one polyamide 6 copolymer may contain between 0.5 and 2 wt. % of isophthalic acid monomers.

The polymeric base composition may further include at least one of glass fibers, antioxidants, and flame retardants.

The at least one polyamide 6 copolymer may have a weight average molecular weight (Mw), as determined by Gel Permeation Chromatography (GPC), between 15,000 Daltons and 30,000 Daltons.

In a further form thereof, the present disclosure provides a method of preparing a semi-aromatic polyamide 6 copolymer for use in manufacturing a finished article via melt processing, the method including the steps of polymerizing tetramethylene diamine, terephthalic acid, and caprolactam monomers in the presence of water to form a prepolymer; and solid state polymerizing the prepolymer to form a semi-aromatic polyamide 6 copolymer having a second heat melting point temperature between 260° C. and 315° C.

The step of polymerizing may further include isophthalic acid monomers.

The semi-aromatic polyamide 6 copolymer may further contain between 25 and 70 wt. % of caprolactam monomers.

The at least one polyamide 6 copolymer may have a weight average molecular weight (Mw), as determined by Gel Permeation Chromatography (GPC), between 15,000 Daltons and 30,000 Daltons.

DETAILED DESCRIPTION

The present disclosure provides polyamide 6 copolymers polymerized from caprolactam, tetramethylene diamine, and terephthalic acid monomers. The copolymers exhibit sufficiently high second heat melting points such that they are capable of being processed using traditional melt processing operations, while also being useful for high temperature applications. The copolymer may be used as polymeric base compositions useful for a variety of applications including the manufacture of metal-replacing articles.

I. Preparation of Polyamide 6 Copolymers.

Caprolactam is traditionally used to form polyamide 6 via ring opening by hydrolysis, followed by polymerization. In the present process, caprolactam, tetramethylene diamine, terephthalic acid, and optionally, isophthalic acid are polymerized together to produce polyamide 6 copolymers including a component of monomers based on caprolactam, a component of monomers based on tetramethylene diamine and terephthalic acid, and optionally, a component of monomers based on isophthalic acid. In this manner, as discussed further below, in the present polyamide 6 copolymers, the polymer chains include monomers, or repeating units, based on caprolactam, monomers, or repeating units, based on tetramethylene diamine and terephthalic acid, and optionally, monomers, or repeating units, based on isophthalic acid, which are mutually present in the polymer chains according to a random or near random distribution.

The strength of the primary bonds in a polymer main chain is the most important determinant of the heat resistance of the overall polymer structure. Breakage of such bonds results in a drop in molecular weight, which leads to a deterioration of mechanical strength. Bond breakages in pendant, or side, groups of the polymer chain may not have as significant an effect, unless such bond breakage subsequently results in breakage of bonds in the polymer main chain. Aromatic ring systems, such as carbocyclic and hetrocyclic ring systems, possess the highest bond strength due to resonance stabilization, and form the basis of almost all heat resistant polymers. The inclusion of other functional groups in the main polymer chain requires careful choice to avoid introducing weak links into an otherwise strong chain. Certain functional groups, such as ether, sulfone, imide, and amide functional groups, are much more heat resistant than others. The presence of aromatic groups in polymer chains may also be desirable because the relatively stiff polymer chains that include such groups offer increased resistance to deformation and thermal softening.

However, the above factors that lead to increased heat resistance in such polymers may also present problems with respect to the synthesis of the polymers. Rigid polymer chains lead to decreased polymer solubility, and may present challenges in obtaining polymer molecular weights sufficiently high to possess mechanical strength. Also, during synthesis, low molecular-weight polymers may precipitate from the reaction mixture and prevent further polymerization. Polymers with highly rigid chains may also be infusible and intractable, which makes them difficult to process. In this manner, the synthesis of heat-resistant polymers may then require a departure away from forming polymer chains with maximum rigidity in order to achieve better solubility and processing properties.

One method to achieve a compromise between solubility and processability of polymers is to introduce flexibilizing linkages and, in connection with the present disclosure, the present inventors have found that the introduction of amide linkages in to the main polymer chain provides a sufficient decrease in rigidity, which facilitates the processability of the polymer. The present polymers have been found to possess an unexpected compromise between heat resistance and processability, in which the heat resistance is relatively high and yet the polymers may be processed substantially conventionally.

Typically, a content of at least about 33 wt. % caprolactam monomers is needed to attain a melt temperature (Tm) of about 300° C. in order to make the polyamide 6 copolymer melt processable, which corresponds to an aromatic monomer (terephthalic acid monomer) content of 33 wt. %. Increasing the caprolactam monomer level further decreases the melting point, however above a caprolactam content of about 50 wt. %,the melting point may falls beneath a desired temperature. In one example, the present polymers may have 31 to 39 wt., 32 to 38 wt. %, or 33 wt. % terephthalic acid monomers, and 22 to 38 wt. % or 25 to 35 wt. % caprolactam monomers.

In the present polyamide 6 copolymers, the caprolactam monomers make up as little as 25 wt. %, 30 wt. %, 35 wt. %, 40 wt. %, 50 wt. % or as great as 60 wt. %, 65 wt. %, or 70 wt. %, of the total weight of monomers, based on the total weight of the polyamide 6 copolymers, or may be present within any range defined between any two of the foregoing values, such as 25 wt. % to 50 wt. %, 40 wt. % to 50 wt. %, 30 wt. % to 33 wt. %, or 32 wt. % to 34 wt. %, for example.

In the present polyamide 6 copolymers, the tetramethylene diamine and terephthalic acid monomers make up as little as 25 wt. %, 30 wt. %, 35 wt. %, 40 wt. %, or as great as 60 wt. %, 65 wt. %, 70 wt. %, 75 wt. %, of the total weight of monomers, based on the total weight of the polyamide 6 copolymers, or may be present within any range defined between any two of the foregoing values, such as 30 wt. % to 70 wt. %, 30 wt. % to 35 wt. %, 65 wt. % to 70 wt. %, or 35 wt. % to 65 wt. %, for example. The term "4T salt" as used herein means a salt of tetramethylene diamine and terephthalic acid. The 4T salt may be produced by dissolving the foregoing components in water, crystallizing by the addition of isopropanol, and drying the salt to less than about 0.5% moisture.

In the present polyamide 6 copolymers, the isophthalic acid monomers make up as little as 0 wt. %, 0.5 wt. %, 1 wt. %, 2 wt. %, or 3 wt. %, of the total weight of monomers, based on the total weight of the polyamide 6 copolymers, or may be present within any range defined between any two of the foregoing values, such as 0-3 wt. %, for example.

The polyamide 6 copolymer may include caprolactam monomers of the following formula:

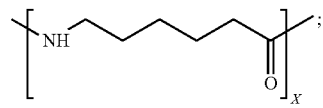

and tetramethylene diamine and terephthalic acid, or 4T salt, monomers of the following formula:

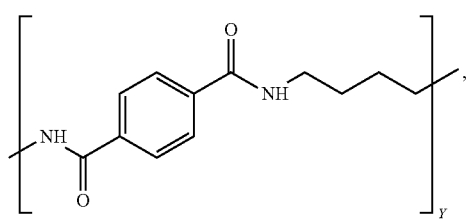

wherein X is between 50 and 300, and Y is between 50 and 300. In various embodiments, X is 100 and Y is 150, while in other embodiments, X is 200 and Y is 300.

In another example, the polyamide 6 copolymer may include caprolactam monomers of the following formula:

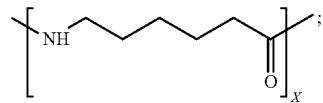

tetramethylene diamine and terephthalic acid, or 4T salt, monomers of the following formula:

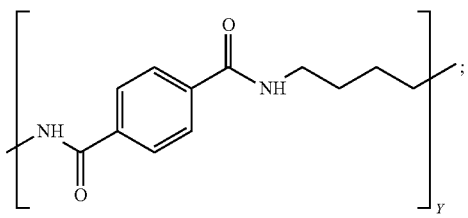

and isophthalic acid monomers of the following formula:

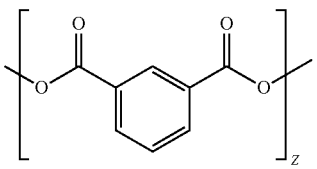

wherein X is between 50 and 300, Y is between 50 and 300, and Z is between 0 and 10. In various embodiments, X is 100, Y is 150, and Z is 0, while in other embodiments, X is 100, Y is 150, and Z is 8.

To form the present polyamide 6 copolymers, the 4T salt is first prepared by adding equimolar quantities of tetramethylene diamine and terephthalic acid in water, forming a concentrated solution, and cooling it. Once cooled, isopropanol is added to the solution to precipitate the salt. This 4T salt is then used for polymerization with caprolactam, and optionally, isophthalic acid. The 4T salt is charged into a reactor with different ratios of caprolactam, along with water, and optionally, isophthalic acid. In various embodiments, antioxidants, and/or excess diamine may also be added to the reactor.

The reaction mixture is then heated in the reactor, where the temperature can be as low as 200° C., or as high as 240° C., or more specifically between 225° C. and 235° C. The heating step may also be carried out in a single step, or in multiple steps. For example, the reaction mixture may be heated for a given period of time at a single temperature, or the reaction mixture may be heated for a first period of time at a first temperature and a second period of time at a second temperature.

Furthermore, during the heating of the reaction mixture, the reaction mixture may be unvented such that the vessel pressure rises to approximately 400 psi during the given time period. In various embodiments, the vessel pressure may be held at the specific pressure for more or less than the given time period. Additionally, the specific pressure may be held at a constant or within a given range, for example between 300 psi and 500 psi, and more specifically between 350 psi and 450 psi, or the specific pressure may be varied for various time frames during the given time period. For example, the vessel pressure may be held at a first pressure, or a range inclusive thereof, for the entire time period, or the vessel pressure may be held at the first pressure for a first portion of the time period and then changed to a second vessel pressure for a second portion of the time period.

Once the reaction mixture reaches a desired pressure and temperature, the water of the mixture is flashed, and a nitrogen purge is initiated. The nitrogen is generally purged into the reactor at a rate of between approximately 5 mL/min and 10 mL/min, and more specifically between 7 mL/min and 8 mL/min. Once the water is flashed and the mixture is swept with nitrogen, the reactor and mixture are then heated for a period of time where the temperature can be as low as 235° C., or as high as 250° C., or more specifically between 240° C. and 245° C.

Once heated for the period of time, the mixture is subsequently cooled to room temperature, and the headspace is vented by sweeping thoroughly with nitrogen. The contents of the reactor are then removed.

The contents of the reactor, which may be in the form of a prepolymer, may be subjected to solid stating to increase the molecular weight of the copolymers. Solid stating may be carried out by subjecting the reactor contents to a temperature as low as 250° C., or as high as 280° C., or more specifically between 260° C. and 265° C., for a period of time as short as 12 hours, or as long as 72 hours, or more specifically between 48 hours and 60 hours.

After solid stating, glass fibers and/or flame retardants may optionally be added to the semi-aromatic polyamide 6 copolymers during melt processing to reinforce the copolymers or enhance the resulting articles of manufacture.

In one particular example, the 4T salt of tetramethylene diamine and terephthalic acid is initially prepared by adding equimolar quantities of tetramethylene diamine and terephthalic acid in water, forming a concentrated solution thereof, and allowing the solution to cool. Once cooled, isopropanol is added to precipitate the 4T salt. The 4T salt is then used for polymerization with caprolactam by charging the 4T salt, caprolactam, water, Irganox 1010 surfactant, hypophosphoric acid, excess diamine, and optionally, isophthalic acid into a 600 mL Parr reactor equipped with a turbine type impeller. The reactor is heated to approximately 210° C., initially, and held there for approximately 2 hours, after which, the contents of the reactor reach a pressure of approximately 400 psi and a temperature of approximately 210° C. Upon reaching the desired pressure, the water within the reactor is flashed, and the nitrogen purge is initiated at a rate of approximately 50 mL/min. The reactor is then heated to approximately 230° C., and held at that temperature for approximately 30 minutes. Subsequently, the reactor is cooled to room temperature and the headspace of the reactor is vented by sweeping thoroughly with nitrogen. Then, the contents of the reactor are removed. After removing the contents from the reactor, solid stating is achieved by subjecting the prepolymers to a temperature of approximately 250° C. for a period of approximately 24 hours. The resulting copolymers are semi-aromatic polyamides.

II. Properties of the Polyamide 6 Copolymers and Articles Made Therefrom.

The polyamide 6 copolymers of the present disclosure may have a weight average molecular weight (Mw), as determined by Gel Permeation Chromatography (GPC), based on polystyrene calibration with hexafluoro isopropanol solvent, of as little as 12,000 Daltons, 15,000 Daltons, or 20,000 Daltons, or as high as 25,000 Daltons, 30,000 Daltons, or 33,000 Daltons, or within any range defined between any two of the foregoing values, such as 12,000 to 33,000 Daltons, 15,000 to 30,000 Daltons, or 20,000 to 25,000 Daltons, for example.

The polyamide 6 copolymers and/or articles of manufacture made therefrom have a second heat melting point as measured by Differential Scanning calorimetry (DSC) according to ASTM D3418 of as little as 260° C., 270° C., or 280° C., or has high as 300° C., 310° C., or 315° C., or may be within any range defined between any two of the foregoing values, such as 260° C. to 315° C., 270° C. to 310° C., or 280° C. to 300° C., for example.

The polyamide 6 copolymers and/or articles of manufacture made therefrom have relatively low water absorption at equilibrium as measured using ASTM D570 as compared to polyamide 6 polymers made from caprolactam monomers. In particular, the polyamide 6 copolymers and/or articles of manufacture made therefrom may have water absorption at equilibrium equal to or less than 3.5%, 3%, or 2.5%, or more preferably equal to or less than 1%. In various embodiments, the water absorption at equilibrium may be as little as 0%, 0.2%, 0.4%, 0.5%, or 1%, or as high as 2.5%, 3%, or 3.5%, or may be within any range defined therebetween, such as 0.2-3.5%, 0.5-3%, or 0.5-1%, for example.

The present heat-resistant polymers may be used in end-use applications including automotive components and consumer electronics devices, where the advantageous properties of the present heat resistant polymers include weight savings in replacing metal items, as well as the ease of processing the polymers into various molded forms via processing methods commonly used with conventional polymers. The present relatively lightweight polymers possess high strength and heat resistance for targeted use in applications as diverse as cell phone cases, intake manifolds in automobile engines, and components and structural parts for chemical and energy generating plants.

The present heat resistant polymers can be further stiffened by the use of glass fiber fillers, for example, with the glass fibers present in the polymer at loading amounts as low as 5 wt. %, 10 wt. %, or 15 wt. %, or as high as 30 wt. %, 35 wt. %, or 40 wt. %, or within any range defined between any two of the foregoing values, such as 5 wt. % to 40 wt. %, 10 wt. % to 35 wt. %, or 15 wt. % to 30 wt. %, for example.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

EXAMPLES

Exemplary formulations were tested using differential scanning calorimetry to determine second heat melting points ($T_m$) in accordance with ASTM D3418.

Example 1

A 600 mL Parr reactor equipped with a turbine type impeller was charged with approximately 50 grams of the 4T salt, approximately 25 grams of caprolactam, approximately 35 grams of water, approximately 0.5% of Irganox 1010 based on the monomer, approximately 30 ppm of hypophosphoric acid based on the monomers, approximately 3% of excess diamine based on the initial amine content. The reactor was heated to 210° C., initially, and held at that temperature for approximately 2 hours, after which the contents of the reactor reached a pressure of approximately 400 psi and a temperature of approximately 210° C. Upon reaching the desired pressure, the water within the reactor was flashed, and a nitrogen purge was initiated at a rate of approximately 50 mL/min. The reactor was then heated to approximately 230° C., and held at that temperature for approximately 30 minutes. Subsequently, the reactor was cooled to room temperature and the headspace of the reactor was vented by sweeping thoroughly with nitrogen. Then, the contents of the reactor were removed. Solid stating was then achieved by subjected the contents to a temperature of 248° C. for a period of approximately 24 hours. The resulting composition had 33 wt. % of caprolactam.

The second heat melting point temperature, $T_m$ for the formed polymer was 307° C.

Example 2

A 600 mL Parr reactor equipped with a turbine type impeller was charged with approximately 50 grams of the 4T salt, approximately 32 grams of caprolactam, approximately 35 grams of water, approximately 0.5% of Irganox 1010 based on the monomer, approximately 30 ppm of hypophosphoric acid based on the monomers, approximately 3% of excess diamine based on the initial amine content, and approximately 0.5 grams of isophthalic acid. The reactor was heated to 210° C., initially, and held there for approximately 2 hours, after which, the contents of the reactor reached a pressure of approximately 400 psi and a temperature of approximately 210° C. Upon reaching the desired pressure, the water within the reactor was flashed, and a nitrogen purge was initiated at a rate of approximately 50 mL/min. The reactor was then heated to approximately 230° C., and held at that temperature for approximately 30 minutes. Subsequently, the reactor was cooled to room temperature and the headspace of the reactor was vented by sweeping thoroughly with nitrogen. Then, the contents of the reactor were removed. Solid stating was then achieved by subjected the contents to a temperature of 248° C. for a period of approximately 24 hours. The resulting composition had 39 wt. % of caprolactam.

The second heat melting point temperature, $T_m$ for the formed polymer was 311° C.

While this disclosure has been described as relative to exemplary designs, the present disclosure may be further modified within the spirit and scope of this disclosure. Further, this application is intended to cover such departures from the present disclosure as come within known or customary practice in the art to which this disclosure pertains.

The invention claimed is:

1. A method of preparing a semi-aromatic polyamide 6 copolymer for use in manufacturing a finished article via melt processing, the method comprising the steps of:
   polymerizing tetramethylene diamine, terephthalic acid, and caprolactam monomers at a temperature of 200° C. to 240° C. in the presence of water to form a prepolymer;
   flashing water from the reaction mixture;
   heating the reaction mixture at a temperature of 235° C. to 250° C.; and
   solid state polymerizing the prepolymer to form a semi-aromatic polyamide 6 copolymer having a second heat melting point temperature between 260° C. and 315° C., as determined by Differential Scanning Calorimetry (DSC) according to ASTM D3418, and a weight average molecular weight (Mw), as determined by Gel Permeation Chromatography (GPC), between 15,000 Daltons and 30,000 Daltons, wherein the semi-aromatic polyamide 6 copolymer contains between 25 and 70 wt. % of caprolactam monomers, based on the total weight of the semi-aromatic polyamide 6 copolymer.

2. The method of claim 1, wherein the step of polymerizing further includes isophthalic acid monomers.

3. The method of claim 1, wherein the solid state polymerizing step is conducted at a temperature of 250° C. to 280° C.

4. The method of claim 1, wherein the at least one polyamide 6 copolymer contains between 35 and 60 wt. % of caprolactam monomers, based on the total weight of the polyamide 6 copolymer.

5. The method of claim 1, wherein the polymerizing step comprises polymerizing tetramethylene diamine, terephthalic acid, and caprolactam monomers at a pressure of 300 psi to 500 psi.

6. The method of claim 1, wherein the semi-aromatic polyamide 6 copolymer has a water absorption at equilibrium according to ASTM D570 of equal to or less than 3.5%.

7. The method of claim 1, wherein the semi-aromatic polyamide 6 copolymer has a water absorption at equilibrium according to ASTM D570 of equal to or less than 1%.

* * * * *